No. 639,261. Patented Dec. 19, 1899.
J. H. MERRILL.
KNOCKDOWN DECOY.
(Application filed May 8, 1899.)
(No Model.)
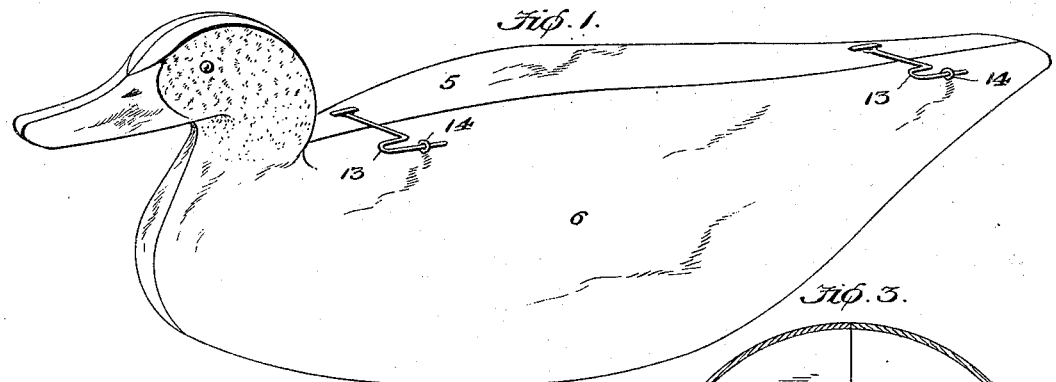
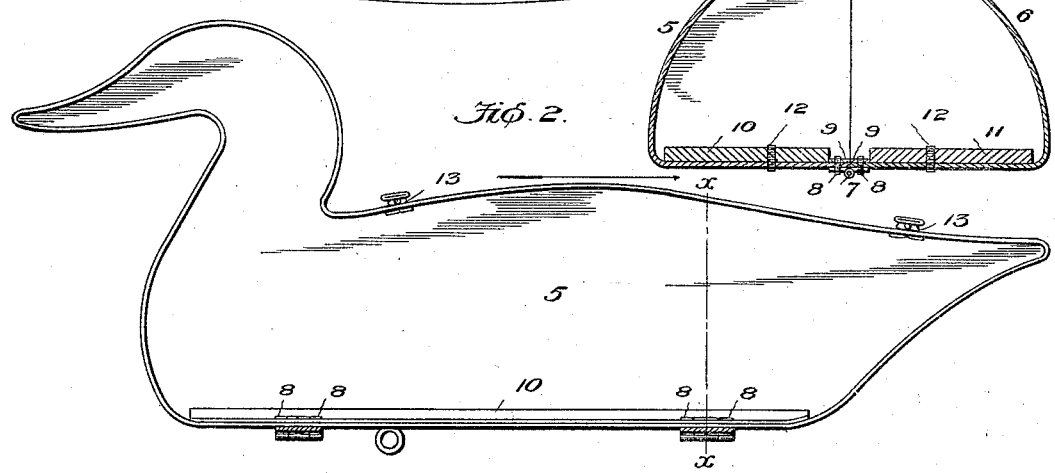
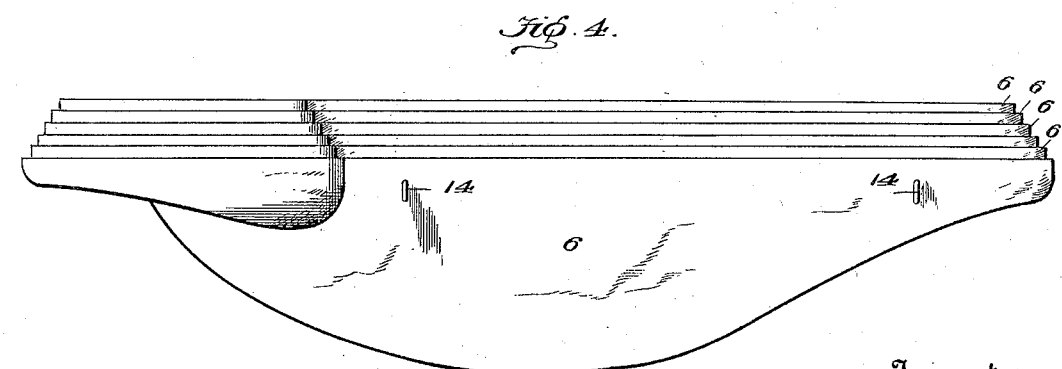
Witnesses
Inventor
Jeremiah Herbert Merrill
By Jas. H. Vermilya
Attorney

UNITED STATES PATENT OFFICE.

JEREMIAH HERBERT MERRILL, OF EXETER, NEW HAMPSHIRE.

KNOCKDOWN DECOY.

SPECIFICATION forming part of Letters Patent No. 639,261, dated December 19, 1899.

Application filed May 8, 1899. Serial No. 716,036. (No model.)

*To all whom it may concern:*

Be it known that I, JEREMIAH HERBERT MERRILL, of Exeter, county of Rockingham, State of New Hampshire, have invented a new and useful Improvement in Knockdown Decoys, of which the following is a full, clear, and exact description, reference being had to the accompanying drawings, making part of this specification.

My invention relates to improvements in knockdown decoys for use by sportsmen in hunting wild fowl; and the principal object in view is to promote the convenience of the sportsman in carrying a large number of the decoys.

A further object of the invention is to provide an article which, in addition to being cheap of manufacture and durable in service, will possess to a high degree the quality of increased buoyancy, so as to float high on the surface of the water.

Heretofore it has been common to make decoys of rubber, waterproof fabrics, wood, and other materials; but such prior decoys have been found objectionable for one reason or another. In case of decoys of wood and other hard substances they are inconvenient to carry and do not have the requisite shape. With decoys made of fabric they require to be stuffed, which increases the tendency of the article to sink in the water, and the requisite material in the necessary quantity is not always available. With inflatable decoys, such as rubber and waterproofed-fabric decoys, they are open to the serious objection of forming air-vents or crevices therein, which allow the air to escape and the decoy to collapse. Such crevices must always be sealed before the decoy can be inflated, and the sealing media is frequently not at hand, particularly when the decoy is to be used. Again, when the decoys are folded and packed away at the end of the gunning season crevices are liable to form therein by creasing the article, and this is particularly annoying to the sportsman in case he should not inspect the decoys until they are to be used. I overcome these objections by a novel construction of decoy made of paper and which I will now proceed to describe in detail in connection with the accompanying drawings, forming a part of this specification, and in which—

Figure 1 is a perspective view of my improved knockdown decoy in condition for use. Fig. 2 is a vertical longitudinal sectional view. Fig. 3 is a vertical transverse section on the line $x\ x$ of Fig. 2. Fig. 4 is a view showing a number of the decoys nested or packed together.

Like numerals of reference denote like parts in each of the several figures.

In manufacturing my improved decoy I construct the same in two longitudinal complemental members or sections 5 6, each of which is a single piece of paper. The members or sections are each molded to the requisite shape and dimensions in a properly-constructed mold, and the sections are adapted to register when they are properly assembled together. Each member embraces one-half of the body, tail, neck, head, and bill of the fowl it is desired to make the decoy resemble, and each section is further coated on its inner surface with oil, paint, or other similar material. The sections are, furthermore, coated with oil and painted on their surfaces to impart a finish thereto, which renders the decoy attractive and makes it closely resemble the fowl. This coating is, furthermore, advantageous in that the decoy is made proof on both its inner and outer surfaces against saturation by water, thus overcoming any tendency to become soaked with water and insuring the desired buoyancy.

The complemental members of my improved decoy are united at the bottom permanently by hinge-joints 7, the pintles of which are disposed longitudinally, and these hinges are fastened to the members or sections by staple-fasteners 8, which pass through the hinges and the bottom parts of the sections. To prevent the staples from pulling out of place and permitting the members to become disconnected, I employ reinforcement-strips 9, of any suitable stiff character, which are fitted to the inner faces of the decoy-sections near the meeting edges of the bottom thereof.

The buoyancy of the decoy is increased by providing cork linings 10 11, which are fitted to the bottoms of the members or sections 5

6, and these linings are secured in position by staples 12 or other fasteners. These cork linings not only increase the buoyancy of the article, but they add strength and stiffness to the bottom and serve to render the decoy more durable in service.

When the article is to be placed in position, it is adjusted to bring the edges of the two sections 5 6 into registration, and the members are held in proper position by the employment of latch devices, consisting of pivoted hooks 13, connected to one section, and keepers or eyes 14, fastened to the other section.

As the decoy is not sealed, it is liable to admit water to the chamber thereof; but this does not affect the buoyancy of the article, because the cork linings will insure the decoy floating high on the surface of the water, so that the decoy can easily be seen. The paper decoy is not affected by the water, because its surfaces, both inside and outside, are rendered waterproof by the application of the oil, varnish, or paint. Nor is the decoy affected in any way by the penetration of shot from a firearm, because the article is not inflatable. When the decoys are gathered by the sportsman, the latches are released to permit the sections to be opened or folded in an outward direction to cause the bottom parts of the sections to abut against each other, and the articles are thus opened for the desired number of decoys to be packed one within the other and nested together for compact storage of the decoys and insure convenience in transporting the same.

Any suitable means for anchoring the decoy may be provided—as, for example, an eye attached to the bottom and adapted to receive a cord.

The article is cheap, simple, and durable. It may be used season after season, because it is not liable to deteriorate.

The decoy may be made of the proper size and dimensions to resemble the desired game—as, for instance, wild ducks and geese.

Having thus fully described my invention, what I claim as new, and desire to secure by Letters Patent, is—

1. As a new article of manufacture, a knockdown decoy consisting of complemental members hinged together at the bottom thereof and each member provided with a cork lining at the bottom thereof, substantially as described.

2. As a new article of manufacture, a knockdown decoy consisting of complemental members united permanently together at the bottom thereof by longitudinal hinges, staples which fasten the hinges in place, reinforcement-strips applied to the inner faces of the sections, along the bottom part thereof and forming bearing-surfaces for the staples, the cork linings fitted individually to the bottom parts of the respective sections, and latch devices adapted to connect the members detachably together, substantially as described.

3. As a new article of manufacture, a knockdown decoy comprising complemental members, each of a single piece of paper molded to the proper contour and having the inner and outer surfaces thereof rendered waterproof by oil or paint, hinges connecting the sections permanently together at the bottom parts thereof, cork linings secured individually to the bottom parts of the respective sections, and latch devices for detachably connecting the members at their otherwise free edges, substantially as described.

In testimony whereof I have set my hand, this 16th day of March, A. D. 1899, in the presence of two attesting witnesses.

JEREMIAH HERBERT MERRILL.

Witnesses:
ROBERT A. JORDAN,
F. W. KITTREDGE.